(12) United States Patent
Wiese

(10) Patent No.: US 8,701,343 B2
(45) Date of Patent: Apr. 22, 2014

(54) WATER DIVERSION SYSTEM

(75) Inventor: Rodney Neville Wiese, Camberwell (AU)

(73) Assignee: Wiese Innovations Pty Ltd, Camberwell, Victoria (AU)

( * ) Notice: Subject to any disclaimer, the term of this patent is extended or adjusted under 35 U.S.C. 154(b) by 0 days.

(21) Appl. No.: 13/501,277

(22) PCT Filed: Oct. 11, 2010

(86) PCT No.: PCT/AU2010/001330
§ 371 (c)(1),
(2), (4) Date: Apr. 11, 2012

(87) PCT Pub. No.: WO2011/041850
PCT Pub. Date: Apr. 14, 2011

(65) Prior Publication Data
US 2012/0199219 A1   Aug. 9, 2012

(30) Foreign Application Priority Data
Oct. 11, 2009   (AU) .................................. 2009904910

(51) Int. Cl.
*A01G 29/00*   (2006.01)
(52) U.S. Cl.
USPC ......................................................... 47/48.5
(58) Field of Classification Search
USPC ......................................................... 47/48.5
See application file for complete search history.

(56) References Cited

U.S. PATENT DOCUMENTS

| 6,241,881 | B1 * | 6/2001 | Pezzaniti | 210/155 |
| 6,428,692 | B2 | 8/2002 | Happel | |
| 7,080,480 | B2 | 7/2006 | Urban et al. | |
| 7,470,362 | B2 * | 12/2008 | Kent | 210/150 |
| 2003/0132150 | A1 * | 7/2003 | Happel | 210/163 |
| 2005/0183997 | A1 * | 8/2005 | Happel et al. | 210/163 |
| 2012/0199219 | A1 * | 8/2012 | Wiese | 137/544 |

FOREIGN PATENT DOCUMENTS

| DE | 3543851 A1 | 7/1986 |
| EP | 0194963 A1 | 9/1986 |
| WO | 2004/107850 A1 | 12/2004 |

OTHER PUBLICATIONS

International Search Report issued in PCT/AU2010/001330, mailed Nov. 23, 2010.

* cited by examiner

*Primary Examiner* — Frank T Palo
(74) *Attorney, Agent, or Firm* — Heslin Rothenberg Farley & Mesiti PC; Andrew K. Gonsalves, Esq.

(57) ABSTRACT

This invention relates to a system for diverting water to improve ground water supplies. The system involves collecting stormwater from hard surfaces, such as roads and pavements, and diverts the stormwater to the landscape underground, including below the road and pavement, where the water may be used for passive irrigation. More specifically, the invention relates to a water diversion system for utilizing stormwater runoff to passively irrigate plants. The system comprises a receptacle for receiving and containing a volume of stormwater runoff, and having an outlet for enabling contained stormwater to flow out of the receptacle. The system further comprises distribution means connected to the outlet of the receptacle for communicating stormwater from the receptacle to a soil profile below the level of the pavement for access by a plant, thereby irrigating the plant. The system also comprises a filter for removing solid particulates from the stormwater entering the distribution means.

19 Claims, 3 Drawing Sheets

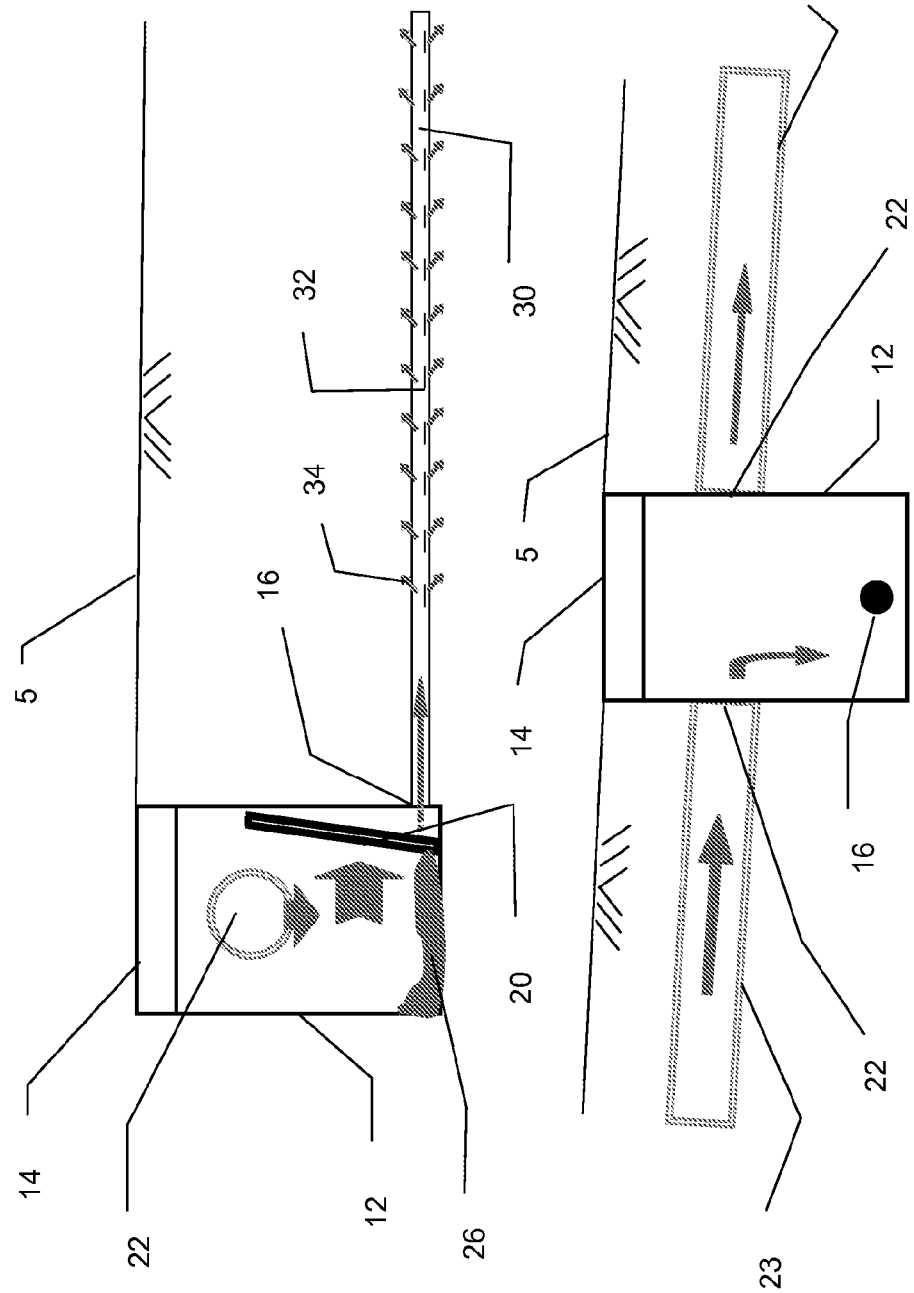

WATER DIVERSION SYSTEM

CROSS-REFERENCE TO RELATED APPLICATIONS

This application is a U.S. National Phase filing under 35 U.S.C. §371 of International Application No. PCT/AU2010/001330, filed Oct. 11, 2010, and published as WO 2011/041850-A1 on Apr. 14, 2011, which claims benefit of priority from Australian Patent Application No. AU 2009904910, filed Oct. 11, 2009. The entire contents of each of the prior applications are incorporated herein by reference in their entirety.

FIELD OF THE INVENTION

The present invention relates to a water diversion system for use in urban environments. The invention has particular, although not exclusive, application to irrigation of road-side plants and trees.

BACKGROUND

It is increasingly becoming apparent that unmitigated stormwater runoff from urban areas is linked to degradation of the stormwater receiving waterways. Specifically, the hard surfaces, such as roads, that are impervious to rainfall prevent infiltration of rainfall and instead very efficiently transport the rainfall via stormwater drainage infrastructure to our urban streams.

This has changed the hydrology of our urban areas so that much more stormwater is being transported more quickly to the streams which in turn causes erosion of the banks and bed.

Base flows of ground water into urban streams are critical to the ecology of the steams. However, the rapid transport of rainfall by the stormwater infrastructure to the urban stream removes the opportunity for the rainfall to infiltrate the ground where it can contribute to the base flow.

Another critical change to urban environments is the development of a "heat island" effect where the temperatures in highly developed areas of cities comprising vast quantities of concrete, steel and asphalt are elevated compared to surrounds that are more vegetated.

The heat island effect has been amplified by climate change where it is demonstrated that better management of vegetation in city areas can have a significant positive impact on the quality of life as well as significant energy reduction.

The combination of reduced base flow and the heat island effect has resulted in significantly drier conditions in urban environments.

At the same time, however, communities are recognizing the value of trees in our urban areas that improve the health of the environment as well as improve aesthetics, general quality of life and reduce energy consumption. However these trees are typically planted in hard surfaces (footpaths and roads) that are formed so that rainwater is directed into the stormwater infrastructure. The trees typically struggle to obtain adequate water supply and therefore local government invest in watering schemes.

Over the summer months trees are watered by hand once or twice a week from a water truck with up to 60 L per application in an attempt to keep them alive. The water is typically dumped into an agricultural drain that protrudes from the ground and or simply dumping water on the surface at the base of the tree. It takes some time for the water to infiltrate into the soil where the roots can access the water. Often the dry soil results in the water simply sitting on the surface or even running off into the stormwater infrastructure. Many trees, therefore, can be left with inadequate watering. In recent drought conditions, many of the trees died due to lack of water.

Recent efforts have been made to promote water sensitive urban design (WSUD) tree pits that are primarily designed to improve stormwater quality, but which have a secondary benefit of passively watering trees.

Installation of the WSUD tree pits involves re-configuring pavement surfaces to divert stormwater, from typically road surfaces, into pit. The pit is prepared to include engineered materials placed in specific layers in which a tree is to be planted. An appropriate tree species to suit the moisture conditions must be selected and drainage is installed under the pit and connected into the stormwater drainage system. Stormwater entering the pit is filtered as it passes downwardly through the engineered materials so that when it reaches the drainage, the stormwater has a substantially reduced contamination.

The WSUD tree pits are often criticized due to cost of engineered materials, drainage connection and pavement re-configuration. They are only applicable to new plantings and rely on consistent periodic maintenance of sediment removal to ensure water quality improvement performance.

There is a need to provide a more cost-effective alternative to the WSUD tree pits that provides irrigation for trees and plants surrounded by pavements and roads.

Beneficially, the alternative stormwater provides passive irrigation to street trees and, optionally, reduces stormwater flows to urban streams.

SUMMARY OF THE DISCLOSURE

Generally speaking, a more cost-effective alternative is provided by a system that involves collecting stormwater from hard surfaces, such as roads and pavements, in a pit that diverts the stormwater to the landscape underground, including below the road and pavement, where the water may be used for passive irrigation.

Accordingly, there is provided a water diversion system for utilizing stormwater runoff to passively irrigate plants, the system comprising:
  (a) a receptacle for receiving and containing a volume of stormwater runoff, and having an outlet for enabling contained stormwater to flow out of the receptacle;
  (b) distribution means connected to the outlet of the receptacle for communicating stormwater from the receptacle to a soil profile below the level of the pavement for access by a plant, thereby irrigating the plant; and
  (c) a filter for removing solid particulates from the stormwater entering the distribution means.

The benefits of the plant irrigation system can be summarized as follows:
  The system can be adopted for a new planting and can be retrofitted to existing plantings.
  Stormwater contained in the receptacle is released to the soil profile at a slow rate at which the soil is able to take up the water. Accordingly, plants are provided with a passive supply of water well after rainfall has finished. Accordingly, the need for active irrigation is, at least, reduced.
  Stormwater is directed into the soil profile that is covered by pavement and would otherwise not receive the water. This puts water back into the landscape to improve the environment and reduce elevated temperatures. This also encourages plant roots to grow deeper in the soil profile, thereby reducing the incidence of tree roots, for example, up-lifting pavement and kerbs in search of water. A further result is that evaporative loss or irrigation water is reduced because the plants are watered at their roots.

Trapping some stormwater in the receptacle Reduces stormwater runoff volumes generated by urbanization that degrade urban waterways.

Stormwater distributed to the soil profile replenishes groundwater and contributes to base flows that report to streams and rivers.

Stormwater particulates are trapped in the pit and, therefore, the filtered stormwater is upgraded and improves water quality downstream.

Trapping and sending stormwater through the soil profile also reduces the soluble pollutant load by reducing stormwater runoff volume reporting to waterways.

The receptacle may be a pit and wherein the outlet comprises an opening at or near a base of the pit to enable water within the pit to flow out under gravity.

The receptacle may have a lid that operates as a coarse filter to remove some solids from a flow of stormwater. Preferably, the lid is a grate that restricts access to the receptacle of the solids, for example, leaves. Optionally, the lid is a permeable material for preventing the particulates such as leaves, litter and sand (generally referred to as gross pollutants) from entering the receptacle.

The receptacle may be located relative to pavement, such as a road, to receive a flow of stormwater runoff from the pavement.

The receptacle may be supplied with stormwater via a conduit from a remote collection location.

The receptacle may include an overflow outlet for transferring excess stormwater to another receptacle or to stormwater drainage infrastructure.

The receptacle may be located generally flush with ground level or a pavement and extend downwardly in the range of 300 to 1200 mm. Typically, the receptacle extends downwardly 400 to 800 mm and preferably around 600 mm.

The filter may comprise a fine mesh for removing solid particles and is inclined to the vertical in situ.

The filter may be housed between a pair of frames hingeably connected at their base to enable removal of the filter in situ by relative rotation of the frames about the hinge.

The frames may be coupled in situ to brackets in the receptacle to secure the filter in the receptacle and wherein the bracket are configured to restrict stormwater access to the outlet through the filter.

The mesh may be covered with a geotextile.

The distribution means may comprise a perforated pipe.

Perforations in the pipe may be restricted to positions that coincide with the location of plants at ground level to facilitate the supply of water to the plants.

The perforations are preferably formed in an underside of the pipe to restrict soil access to the pipe.

The perforations may be up to 150 mm in length and less than 2 mm in width.

The pipe may include 2 or more perforations per meter of pipe.

The pipe may be enclosed in a geotextile sleeve to restrict soil access to the pipe.

BRIEF DESCRIPTION OF THE DRAWINGS

A system according to an embodiment of the invention will now be described, by way of example only, with reference to the accompanying drawings, in which:

FIG. 3A is a schematic cross-section in a first direction of an alternative embodiment that incorporates the system in a drainage network.

FIG. 3B is a schematic cross-section in a second, orthogonal direction of the alternative embodiment in FIG. 3A.

DETAILED DESCRIPTION

Figure 1:
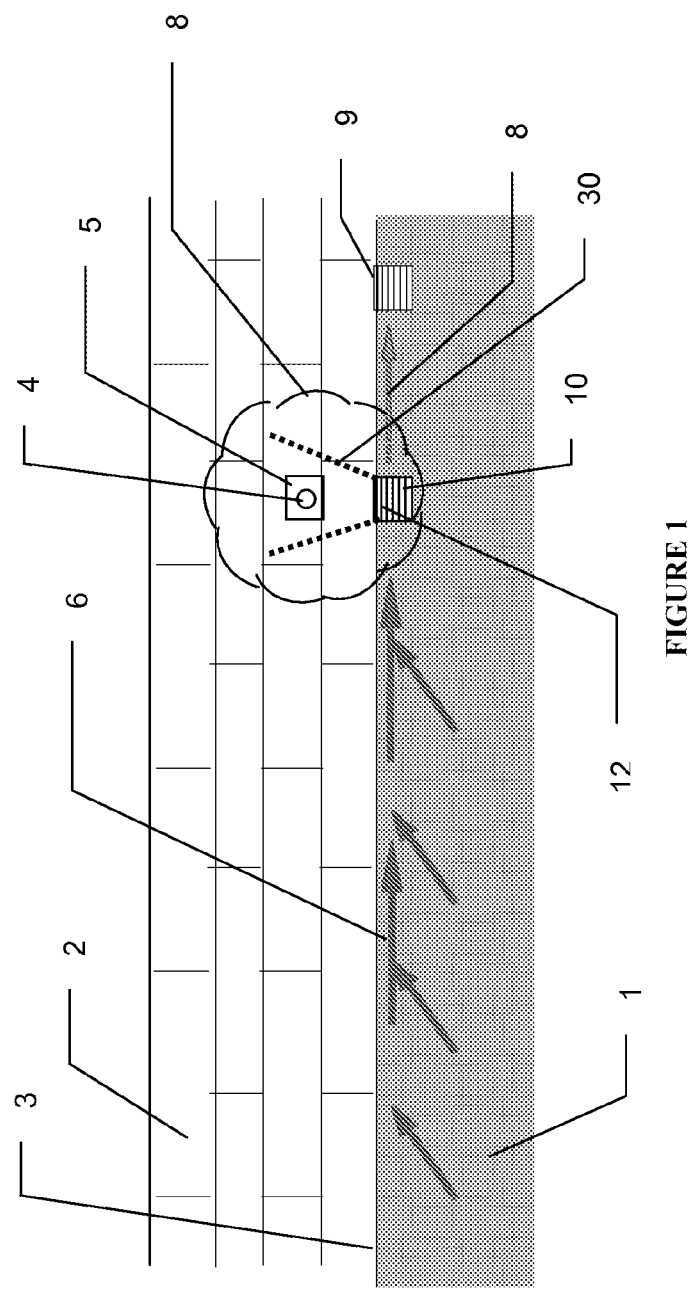
FIG. 1 is a top plan view of a passive tree watering system incorporated into a drainage network for a bitumen-covered road.
Figure 2:
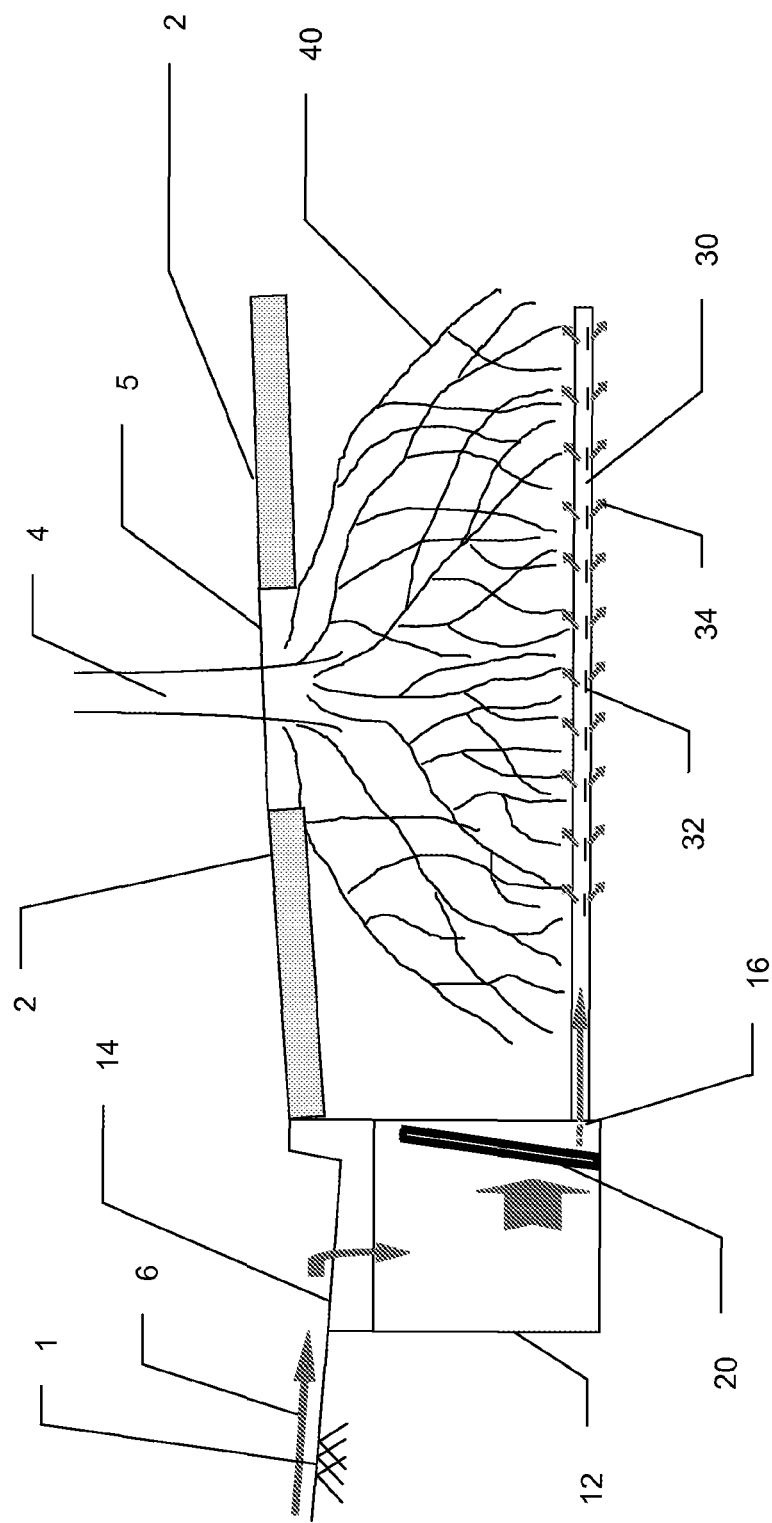
FIG. 2 is a schematic cross-section of the system shown in FIG. 1.

An irrigation system 10 according to a first embodiment is shown in FIGS. 1 and 2.

The system 10 comprises a receptacle, in the form of a pit 12, a distribution means, in the form of a perforated pipe 30, and a filter, in the form of a filter assembly 20.

In a typical streetscape, a road 1 and a pavement 2 are separated by a gutter 3 and rain falling on the road 1 and pavement 2 drains into the gutter 3 and travels to a stormwater drain 9 where it is transported to urban streams.

It is also often the case that plants, such as a tree 4, are incorporated into the streetscape for aesthetic reasons. The pavement 2 placed around the tree 4 results in a very small area of exposed earth 5 which typically collects water for supply to the tree. However, the supply of water from rainfall is very small. As a general rule, the root structure of a tree is generally as broad as the foliage 8. Accordingly, the exposed earth 5 is insufficient to supply water to the entire root system via water seepage through the exposed earth 5. The tree roots consequently grow upwardly in search of water and typically uplift the kerb 3 and pavement 2 which can result in hazards to pedestrians.

The embodiment illustrated in FIGS. 1 and 2 incorporates the pit 12 with a grate 14 substantially flush with the road 1 to receive storm water flow 6 from the road 1 and along the kerb 3.

The pit 12 has an outlet 16 at a lower portion of the pit 12 that enables storm water collected in the pit 12 to flow out of the pit 12 under the influence of gravity. The perforated pipe 30 is connected to the outlet and has perforations 32 that enable water in the pipe 30 to exit as an irrigation flow 34 into the surrounding soil. The perforated pipe 30 is strategically positioned around the root level of the tree 4 to moisten the soil in the vicinity of roots 40, thereby encouraging downward growth of roots 40 away from the pavement 2 and kerb 3.

It will be appreciated that storm water flow 6 will carry with it pollutants from the road 1 and pavement 2, including fine solid particles which may settle in the perforated pipe 30 and cause it to become clogged. Accordingly, the filter 20 is disposed in the pit 12 to filter solid particles from the flow of water entering the perforated pipe 30 via the outlet 16. Solid particles collecting in the pit 12 can be removed by periodic maintenance. Additionally, any solid particles passing the filter 20 may be removed from the perforated pipe 30 by a flushing operation.

In order to prevent soil and the roots 40 from entering the perforated pipe 30, a geotextile fabric may be placed over the perforated pipe 30.

In an alternative form shown in FIGS. 3A and 3B, the storm water flow may be provided by an inlet pipe 23 via inlet 22 to the pit 12. The inlet pipe 23 receives the storm water flow from conventional storm water drains 9. Storm water entering the pit 12 is handled in the same manner as described above, namely storm water is filtered by the filter 20 and ultimately released from the perforated pipe 30 as an irrigation flow 34 via the perforations 32.

The pit includes an overflow outlet 24 that allows excess storm water flow 6 to pass into an overflow pipe 25 which may be arranged to supply the excess storm water flow 6 to further pits 12. Accordingly, overflow via the grate 14 is avoided.

Pit 12:

The purpose of the pit is to:
a. House the filter
b. Provide a store of water to continue to provide water for infiltration
c. Store any storm water pollutants that enter the pit Water enters the pit in 2 ways:
1. Via the pit lid which may typically comprise of a grate or permeable pavement (refer to FIGS. 1 and 2).
2. Via piped infrastructure into the side of the pit (refer to FIG. 3)

In the case of storm water being utilized for passive watering, gross pollutants should be prevented from getting into the sub-surface slotted (or perforated) pipe. The pit addressed the gross pollutants in the following ways:

For a pit lid constructed of permeable concrete (e.g. no-fines concrete), the gross pollutants will not enter the pit For a grated inlet the large items will be caught on the grate or pass over the grate. The smaller particles will enter the pit and will remain there until removed.

For storm water pipes directly entering the pit, the gross pollutants will remain in the pit until removed (refer to FIG. 3). If a storm water quality device is installed on the inflow pipe upstream then the frequency of pit clean-outs would be reduced.

Excess storm water flows may fill the pit for temporary storage and infiltrating at a later time when the soil has time to absorb further water. Any additional flows entering the system 10 will bypass by reporting overland as shown in FIG. 1 or continue flowing down the drainage system as shown in FIG. 3.

The pit 12 is typically made from concrete, polycrete, plastic or fiberglass. In most application like roads it is expected that concrete will typically be used.

The pit 12 is typically approximately 600 mm in depth so that the sub-surface connection is below the road pavement and also the major roots in the case of passively watering trees. This may vary depending on the expected depth of the root system 40 intended to be watered however it would be uncommon to be less than 300 mm or greater than 1200 mm for most purposes.

The pit 12 may be deeper in cases where the site slopes area relatively steep or the system as part of a storm water management strategy to reduce runoff volumes to help counter the degradation of the receiving waterways.

The width and length of the pit 12 may vary considerably depending on how much water is wished to be stored and the available construction budget. However the dimensions would typically be approximately 600 mm×600 mm. Relatively deep pits would need to increase either the length or the width to satisfy typically requirements for access.

Filter 20:

The filter 20 is the final barrier to prevent solids from being conveyed sub-surface to the area intended to be wetted via perforated or slotted pipe. The filter 20 is at an incline as shown in FIG. 1 so it will not significantly affect the particulate storage volume. The dimensions of the filter 20 are similar to the pit length and depth.

The filter 20 has a very fine aperture to ensure that even very small particles (<0.1 mm) will not pass through to the slotted pipe. It is made from non-rusting materials to suit the very wet conditions.

The filter 20 is designed to withstand the weight of sediment and water as well as maintenance equipment such as vacuum suction trucks. The filter 20 is removable for maintenance purposes.

It will typically comprise of a hinged grate (not shown) that will sandwich a fine mesh screen. The hinge is located at the floor of the pit so that the grate may be opened in situ to enable the mesh screen to be removed for maintenance with or without removal of the hinged grate component.

Brackets (not shown) typically formed of angled steel are fitted to the inside of the pit to secure the filter 20 and also prevent sediment materials outflanking the filter 20 around the perimeter.

The fine mesh screen may be placed in non-woven geotextile (not shown) to provide a very fine filtration. The geotextile may be in a fitted bag form and be readily replaced if it becomes clogged over time.

Perforated Pipe 30:

The perforated pipe 30 conveys the filtered water to the desired location. This may be in a number of configurations in or around plant roots 40 and comprise numerous pipes.

The pipe 30 may have a flush point to facilitate maintenance however access may still be gained through the pit for a jetting clean if necessary.

Slotted PVC or UPVC pipe with nominal 90 mm diameter will typically be used in the system 10 due to the pipe stiffness. However other materials may be used such as polyethylene depending on construction requirements.

The pipe 30 must be sealed appropriately to the pit 12 to ensure that water does not leak from any point other than the pipe 30. The perforations 32 may be near the pit 12 or could be some distance away depending on where the water is intended to be infiltrated.

Manual perforating of the pipe 30 is preferred so that only the underside of the pipe 30 is slotted to minimize the potential for soil ingress. The perforations 32 may take the form of slots at 5 & 7 o'clock positions with approximately 3×150 mm slots at both positions per meter length of pipe. The slot width should be no more than 2 mm.

A geotextile sock is considered acceptable, particularly if the pipe 30 is slotted around the perimeter.

The construction method for the system 10 will vary from site to site. Services such as telecoms, water, gas etc. exist adjacent roads so care must be taken during construction. This is no different for typical pit installations however installation of the slotted pipe 30 in retrofit areas can be difficult. The vacuum method is preferred for retrofit sites as this does not damage services, can tunnel under existing trees to install the pipe 30 and is cost effective if there are numerous systems 10 to install concurrently. This involves jetting high pressure water to break the soil, thereby making a tunnel to install the pipe 30 and sucking all the soil into the truck.

Application:

Passive Watering

The system 10 will typically be used in streetscapes (refer FIGS. 1 and 2) where trees have been planted in impervious area severely limiting natural water recharge to get moisture to the root zone. Stormwater runoff will typically enter the grate 14 where any gross pollutant will be caught and remain in the pit 12 until removed. Alternatively water may enter via a permeable pavement lid or via a pipe directly into the side of the pit 12 (FIGS. 3A and 3B). The water in the pit 12 will pass through the filter 20 and enter the perforated pipe 30 below or around the roots where exfiltration will supply water to the area. This may apply to existing vegetation or newly planted vegetation likely resulting in no active irrigation being required except in extreme conditions.

Landscape Rejuvenation.

Water may enter the pit 12 as for passive irrigation but may not be limited to storm water as a source and the pit 12 may not be adjacent a road way. The water in the pit 12 passes through the filter 20 before entering the pipe 30 to exfiltrate water into the landscape.

Flow rates in excess of the filter and infiltration capacity will back water up in the pit 12 until it reaches an alternative path known as a bypass. This may be at the top of the grate 14 as shown in FIG. 1 or via an overflow pipe 25 as shown in FIG. 3.

The bypass ensures that nuisance flooding does not occur as a result of the system 14 being installed.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Many modifications may be made to the preferred embodiment of the present invention as described above without departing from the spirit and scope of the present invention.

The invention claimed is:

1. A water diversion system utilizing stormwater runoff to passively irrigate a soil profile covered by pavement and to reduce stormwater runoff volumes, the system comprising:
   (a) a receptacle containing a volume of stormwater runoff, and having an outlet enabling contained stormwater to flow out of the receptacle;
   (b) a filter removing solid particulates from the stormwater contained in the receptacle such that the solid particulates collect within the receptacle; and
   (c) a perforated pipe disposed within the soil profile and connected to the outlet of the receptacle and releasing the filtered stormwater from the receptacle to within the soil profile such that the filtered stormwater irrigates a plant root system that is at least partially covered by the pavement.

2. The system defined in claim 1, wherein the receptacle is a pit and wherein the outlet comprises an opening at or near a base of the pit to enable water within the pit to flow out under gravity.

3. The system defined in claim 1, wherein the receptacle includes a lid that operates as a coarse filter to exclude some solids from a flow of stormwater into the receptacle.

4. The system defined in claim 3, wherein the lid is a grate that restricts access to the receptacle of the solids, for example, leaves and litter.

5. The system defined in claim 3, wherein the lid is a permeable material for removing gross pollutants.

6. The system defined in claim 1, wherein the receptacle is located relative to pavement to receive a flow of stormwater runoff from the pavement.

7. The system defined in claim 1, wherein the receptacle is supplied with stormwater via a conduit from a remote collection location.

8. The system defined in claim 1, wherein the receptacle includes an overflow outlet for transferring excess stormwater to another receptacle or to stormwater drainage infrastructure.

9. The system defined in claim 1, wherein the receptacle is located generally flush with ground level or a pavement and extends downwardly in the range of 300 to 1200 mm.

10. The system defined in claim 9, wherein the receptacle extends downwardly 400 to 800 mm.

11. The system defined in claim 1, wherein the filter comprises a fine mesh for removing solid particles and is inclined to the vertical in situ.

12. The system defined in claim 1, wherein the filter is housed between a pair of frames hingeably connected at their base to enable removal of the filter in situ by relative rotation of the frames about the hinge.

13. The system defined in claim 1, wherein perforations in the pipe are restricted to positions that coincide with the location of plants at ground level to facilitate the supply of water to the plants.

14. The system defined in claim 1, wherein the perforations are formed in an underside of the pipe to restrict soil access to the pipe.

15. The system defined in claim 1, wherein the perforations are up to 150 mm in length and less than 2 mm in width.

16. The system defined in claim 1, wherein the pipe includes 2 or more perforations per meter of pipe.

17. The system defined in claim 1, wherein the pipe is enclosed in a geotextile sleeve to restrict soil access to the pipe.

18. A method of passively irrigating a soil profile covered by pavement, the method comprising the steps of:
   (a) collecting storm water runoff in a receptacle;
   (b) filtering the storm water runoff; and
   (c) distributing filtered storm water runoff to pipes disposed within the soil profile that is covered by the pavement, such that storm water runoff is distributed within the soil profile.

19. The method of claim 18, wherein the pavement includes an aperture through which a plant extends and the method involves distributing water through the pipes to the soil profile to be accessible to plant roots that are inaccessible to storm water from the ground surface.

* * * * *

UNITED STATES PATENT AND TRADEMARK OFFICE
CERTIFICATE OF CORRECTION

PATENT NO. : 8,701,343 B2
APPLICATION NO. : 13/501277
DATED : April 22, 2014
INVENTOR(S) : Rodney Neville Wiese It is certified that error appears in the above-identified patent and that said Letters Patent is hereby corrected as shown below:

On the Title Page

In the Assignee Item (73): Delete "Wiese Innovations Pty Ltd." and insert -- Wiese Innovations Pty Ltd (As Trustee Of The Putie Family Trust) --

Signed and Sealed this
Eighth Day of July, 2014

Michelle K. Lee
*Deputy Director of the United States Patent and Trademark Office*